United States Patent [19]
Casazza

[11] 3,921,327
[45] Nov. 25, 1975

[54] FISH HOLDER
[76] Inventor: Nello Louis Casazza, 5532 Manila Ave., Oakland, Calif. 94618
[22] Filed: Sept. 9, 1974
[21] Appl. No.: 504,527

Related U.S. Application Data
[63] Continuation-in-part of Ser. No. 359,500, May 11, 1973, abandoned.

[52] U.S. Cl. .............................. 43/4; 17/66; 17/70
[51] Int. Cl.² ................... A01K 97/00; A22C 25/00
[58] Field of Search ................ 43/4, 53.5; 119/154; 128/324; 81/420, 425 A, 425 R, 426; 17/66, 70, 75

[56] References Cited
UNITED STATES PATENTS
3,201,888  8/1965  Barbee ...................................... 43/4
3,214,859  11/1965  Watkins ............................... 43/53.5

Primary Examiner—Louis G. Mancene
Assistant Examiner—Peter K. Skiff
Attorney, Agent, or Firm—Harris Zimmerman

[57] ABSTRACT

A fish holder particularly designed to hold a catfish after catching the same in order to remove the hook from the mouth of the fish. The holder includes a pair of opposed jaw elements selectively movable from and towards each other. One of the jaw elements is substantially flat and the second jaw element is of generally C-shaped configuration, and includes a web portion parallel to and spaced from said first jaw, and flange portions which are perpendicular to and disposed adjacent the ends of said first jaw when the jaws are in their closed or operative position. A medial portion of the web of the second jaw is provided with a fish spine receiving opening.

7 Claims, 5 Drawing Figures

U.S. Patent  Nov. 25, 1975  3,921,327
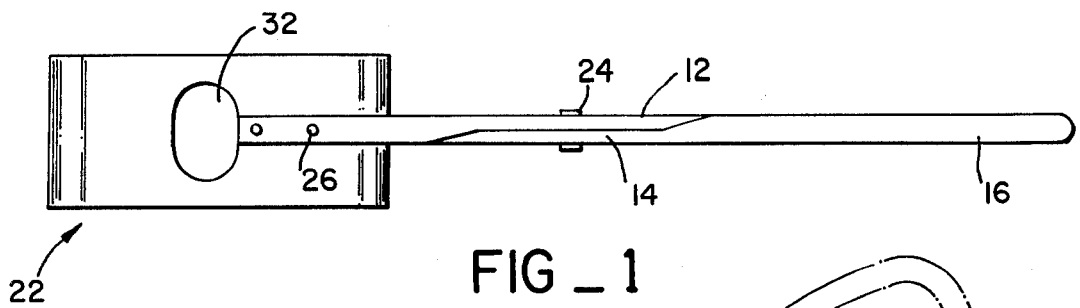
FIG_1
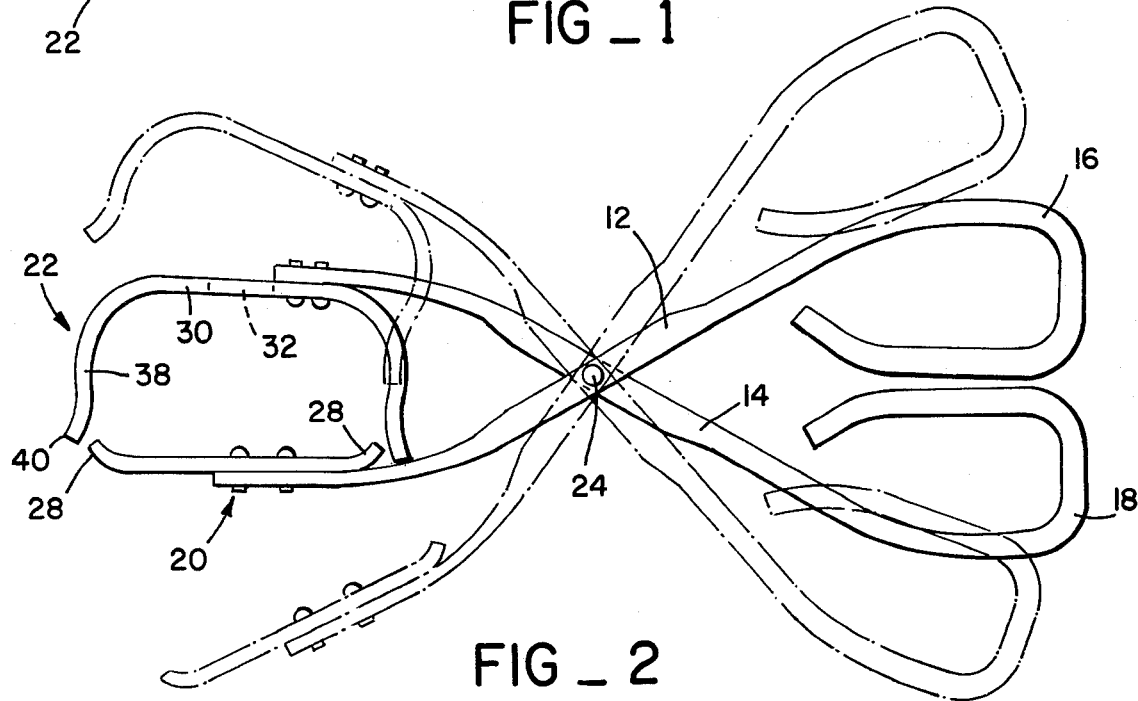
FIG_2
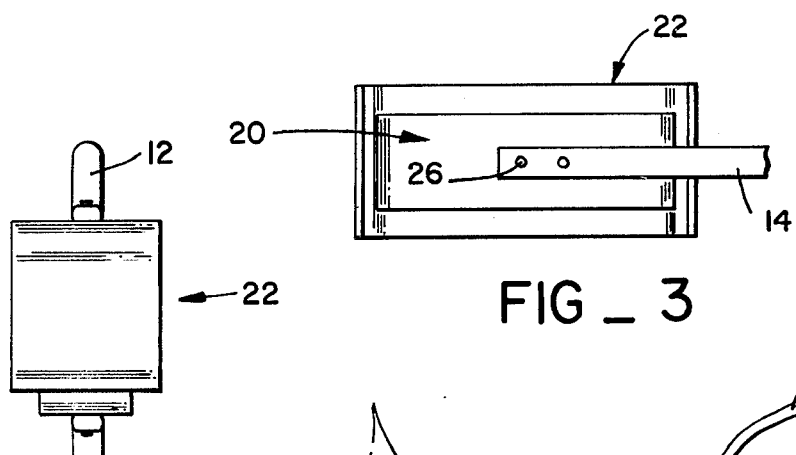
FIG_3
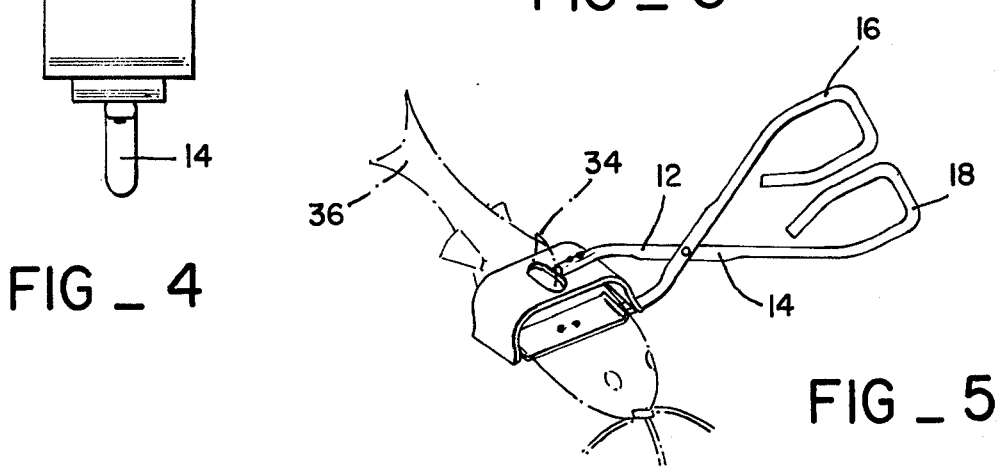
FIG_4
FIG_5

3,921,327

FISH HOLDER

CROSS-REFERENCE TO RELATED APPLICATION

This application is a continuation-in-part of my co-pending application, Ser. No. 359,500, filed May 11, 1973, now abandoned.

BACKGROUND OF THE INVENTION

As above indicated, the holder of the present invention was designed in order to provide a convenient tool for holding a catfish while removing a hook from its mouth. After catching most varieties of fish, it is not too difficult for the fisherman to grasp the fish with one hand and then use his other hand to detach the hook from the mouth of the fish. However, a catfish has three fin spines, one on the back, and one on each side, and it is extremely difficult to hold such a fish, particularly after gyrating, without injuring one's hands. It has been found that if a catfish can be held with pressure applied to its belly, the fish will stop twisting, and the hook may be easily removed.

The holder of the present invention permits the catfish to be held adjacent its head, with pressure applied to the underside of the fish opposite the center fin spine with one jaw element, while the latter is received in an opening provided in a second jaw element. The jaw elements are manually controlled for movement from and towards each other.

THE DRAWING

FIG. 1 is a top plan view of the holder of the present invention;

FIG. 2 is a side elevational view thereof, the closed or operative position of the parts being shown in solid lines, and the open or inoperative position of the parts being shown in phantom lines;

FIG. 3 is a bottom plan view;

FIG. 4 is an end view; and

FIG. 5 is a perspective view of the holder with a catfish secured thereby.

DESCRIPTION OF THE PREFERRED EMBODIMENT

As illustrated in the drawing, the holder of the present invention comprises a pair of handles 12 and 14, each terminating at one end in a manually engageable grip portion 16 and 18, and each terminating at their other end in a jaw portion 20, 22. The handles are pivotally secured together intermediate their ends by a pivot pin 24 whereby movement of the grips 16 and 18 from and toward each other produces similar movement of the jaw portions between their open inoperative position and their closed operative position.

The particular configuration of the jaws constitutes an important aspect of this invention. As best shown in FIG. 2 of the drawing, jaw 20 is a plate of generally flat rectangular shape with its greater length extending along the length of its handle and its width extending laterally and equally from the handle 14 to which it is secured by rivets 26 or the like. The plane of the plate is parallel to the axis of pivot pin 24 and thus perpendicular to the plane of movement of the handles. The distal ends 28 of the plate curve up slightly towards the jaw 22.

Jaw 22 is formed from generally strap-like rigid material and bent into C-shaped configuration, including a central plate-like web portion 30 generally parallel to and spaced from jaw 20 when the handles are closed. The width of jaw 22 is greater than jaw 20 and disposed medially of the web 30 is an aperture 32 whose function is to receive the spine fin 34 of a catfish 36 as will be later described. The ends of the plate 30 are curved downwardly in the nature of flanges 38 whose ends 40 lie adjacent the ends 28 of jaw 20 when the jaws are closed, with the jaws defining a generally rectangular opening. The ends 40 curve slightly outwardly to facilitate movement of the jaws into a closed position when a fish is disposed therebetween.

In using the device, after a catfish has been caught, the fisherman will hold the fish by the line close to the mouth of the fish with one hand, the holder is opened with the other hand and the center fin spine, or back spine, is directed into the aperture 32. The handles are then moved into their closed position, and the jaw 20 pressing on the under side of the fish, coupled with the locking of the spine and the downward pressure of jaw 22 will result in the fish ceasing further motion and will permit removal of the hook without ever being required to actually grasp the fish with a hand. Obviously, the tool can also be used in removing a catfish from a stringer or holding tank.

I claim:

1. A catfish holder comprising a pair of handles, means pivotally securing said handles together for movement in a first plane normal to the axis of said means, each of said handles having a cooperating jaw element at an end thereof, one of said jaw elements comprising a first substantially flat plate-like member lying in a plane normal to the plane of movement of said handles, the other of said jaw elements comprising a second substantially flat plate-like member parallel to and spaced from said first jaw element when said handles are in their closed operative position, said second member having an aperture therein spaced medially of the same, and said second member further having flanges extending generally normal to said member and terminating adjacent the ends of said first member when said handles are in their closed operative position, the distal ends of said first plate diverging upwardly and outwardly.

2. A holder as set forth in claim 1 in which each of said members is of generally rectangular configuration and extending along the length of their respective handles.

3. A holder as set forth in claim 1 in which said second member is wider than said first member.

4. A holder as set forth in claim 1 in which the distal ends of said flanges flare outwardly and away from each other.

5. A holder as set forth in claim 1 in which said aperture is of generally oval shape with the greater length thereof extending along the width of the second plate member.

6. A holder as set forth in claim 1 in which each of said plate members extend laterally from each side of its respective handle.

7. A fish holder comprising a pair of handles, pivot means securing said handles together for rotation in a first plane, each of said handles having a cooperating jaw element at an end thereof, one of said jaw elements comprising a first plate-like member disposed in a plane normal to said first plane, the other of said jaw elements comprising a second C-channel member having a web parallel to said first member and a pair of sides extending normally from opposed edges of said web to define a channel cavity, said web including an aperture disposed centrally therein, and said first member extending substantially between the distal edges of said sides when said handles are in their closed operative position.

* * * * *